US012003889B1

(12) United States Patent
Rajasekar et al.

(10) Patent No.: US 12,003,889 B1
(45) Date of Patent: Jun. 4, 2024

(54) COLLABORATIVE VIRTUAL SPACES

(71) Applicant: RingCentral, Inc., Belmont, CA (US)

(72) Inventors: Badri Rajasekar, Walnut Creek, CA (US); Gustavo Garcia, Madrid (ES); Adam Ullman, Croydon Park (AU); Matthew Wilson, Round Rock, TX (US)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 17/681,326

(22) Filed: Feb. 25, 2022

(51) Int. Cl.
*H04N 7/15* (2006.01)
*G06F 3/04815* (2022.01)
*G06Q 10/101* (2023.01)

(52) U.S. Cl.
CPC ......... *H04N 7/157* (2013.01); *G06F 3/04815* (2013.01); *G06Q 10/101* (2013.01)

(58) Field of Classification Search
None
See application file for complete search history.

(56) References Cited

U.S. PATENT DOCUMENTS

| | | | | |
|---|---|---|---|---|
| 11,362,848 B1* | 6/2022 | Lin | ..... | H04N 7/157 |
| 2004/0008635 A1* | 1/2004 | Nelson | ..... | H04N 7/147 |
| | | | | 709/204 |
| 2011/0169927 A1* | 7/2011 | Mages | ..... | G06F 3/04815 |
| | | | | 348/51 |
| 2022/0124125 A1* | 4/2022 | Punwani | ..... | G06F 3/0484 |
| 2023/0055241 A1* | 2/2023 | Zionpour | ..... | G06F 40/166 |

* cited by examiner

*Primary Examiner* — Stella Higgs
(74) *Attorney, Agent, or Firm* — Ansari Katiraei LLP; Arman Katiraei; Sadiq Ansari

(57) ABSTRACT

Systems, methods, and computer-readable media are provided for rendering a shared virtual meeting environment during a video meeting session. The shared virtual meeting environment comprises a shared virtual space which is accessible to the meeting participants and includes video streams for each of the respective meeting participants. The video streams may be repositioned within the shared virtual space based on user interaction within the shared virtual space.

20 Claims, 9 Drawing Sheets

COLLABORATIVE VIRTUAL SPACES

TECHNICAL FIELD

Embodiments of the invention relate to video meeting platforms. More specifically, embodiments of the invention relate to providing collaborative virtual spaces within a video meeting platform environment.

In many cases, video meetings are restricted to video and audio streams with no interactable spatial elements. Further, the video streams within said video meetings generally have a fixed layout which cannot be changed or updated during the video meeting. Accordingly, said video meetings fail to provide an experience which is both immersive and functional for the meeting participants.

SUMMARY

Embodiments of the invention solve the above-mentioned problems by providing systems, methods, and computer-readable media for providing a shared virtual meeting environment within a video meeting session. The shared virtual meeting environment comprises a shared virtual space which is accessible to the meeting participants and allows the meeting participants to interact in various ways during the video meeting session.

A first embodiment of the invention is directed to one or more non-transitory computer-readable media storing computer-executable instructions that, when executed by at least one processor, perform a method for providing a shared virtual meeting environment within a video meeting session, the method comprising rendering a shared virtual space for display during the video meeting session, determining, for each user of a plurality of users, an initial action point within the shared virtual space corresponding to the respective user of the plurality of users, rendering a plurality of video streams for display during the video meeting session, each video stream of the plurality of video streams corresponding to a respective user of the plurality of users, wherein each video stream of the plurality of video streams is overlaid onto the shared virtual space in proximity to the respective initial action point associated with the respective user, receiving a user interaction within the shared virtual space from a first user of the plurality of users, determining, based on the user interaction, an updated action point for the first user, and responsive to the user interaction, repositioning a video stream of the first user in proximity to the updated action point within the shared virtual space.

A second embodiment of the invention is directed to a method for providing a shared virtual meeting environment within a video meeting session, the method comprising rendering a shared virtual space for display during the video meeting session, determining, for each user of a plurality of users, an initial action point within the shared virtual space corresponding to the respective user of the plurality of users, rendering a plurality of video streams for display during the video meeting session, each video stream of the plurality of video streams corresponding to a respective user of the plurality of users, wherein each video stream of the plurality of video streams is overlaid onto the shared virtual space in proximity to the respective initial action point associated with the respective user, receiving a user interaction within the shared virtual space from a first user of the plurality of users, determining, based on the user interaction, an updated action point for the first user, and responsive to the user interaction, repositioning a video stream of the first user in proximity to the updated action point within the shared virtual space.

A third embodiment of the invention is directed to a system for video meetings, the system comprising one or more data stores, and at least one processor programmed to perform a method for providing a shared virtual meeting environment within a video meeting session, the method comprising rendering a shared virtual space for display during the video meeting session, determining, for each user of a plurality of users, an initial action point within the shared virtual space corresponding to the respective user of the plurality of users, rendering a plurality of video streams for display during the video meeting session, each video stream of the plurality of video streams corresponding to a respective user of the plurality of users, wherein each video stream of the plurality of video streams is overlaid onto the shared virtual space in proximity to the respective initial action point associated with the respective user, receiving a user interaction within the shared virtual space from a first user of the plurality of users, determining, based on the user interaction, an updated action point for the first user, and responsive to the user interaction, repositioning a video stream of the first user in proximity to the updated action point within the shared virtual space.

Additional embodiments of the invention are directed to a shared virtual space displayed within a video meeting session in which a plurality of video streams corresponding to a respective plurality of meeting participants are positioned based at least in part on user interaction within the video meeting session.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
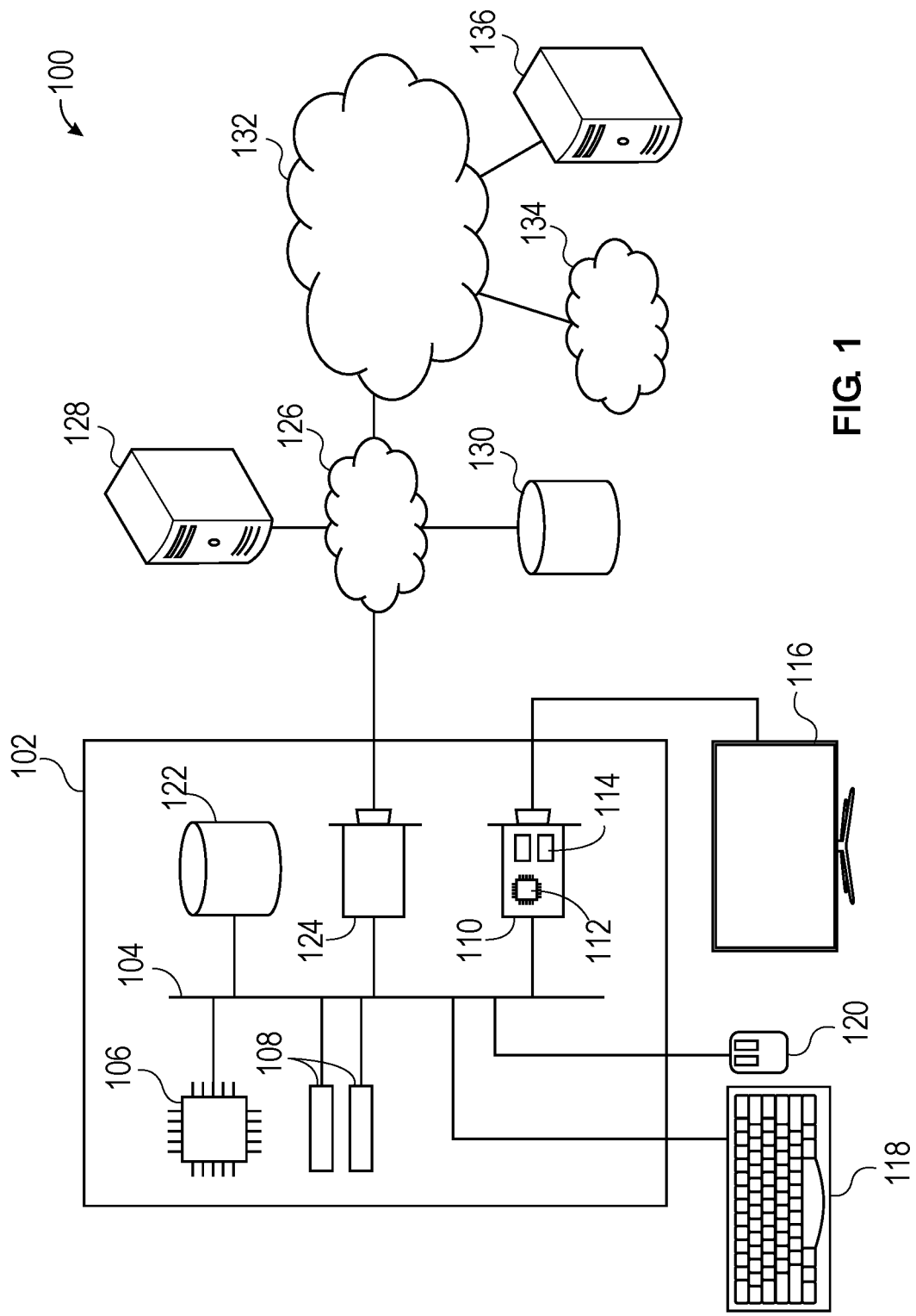
FIG. 1 depicts an exemplary hardware platform relating to certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
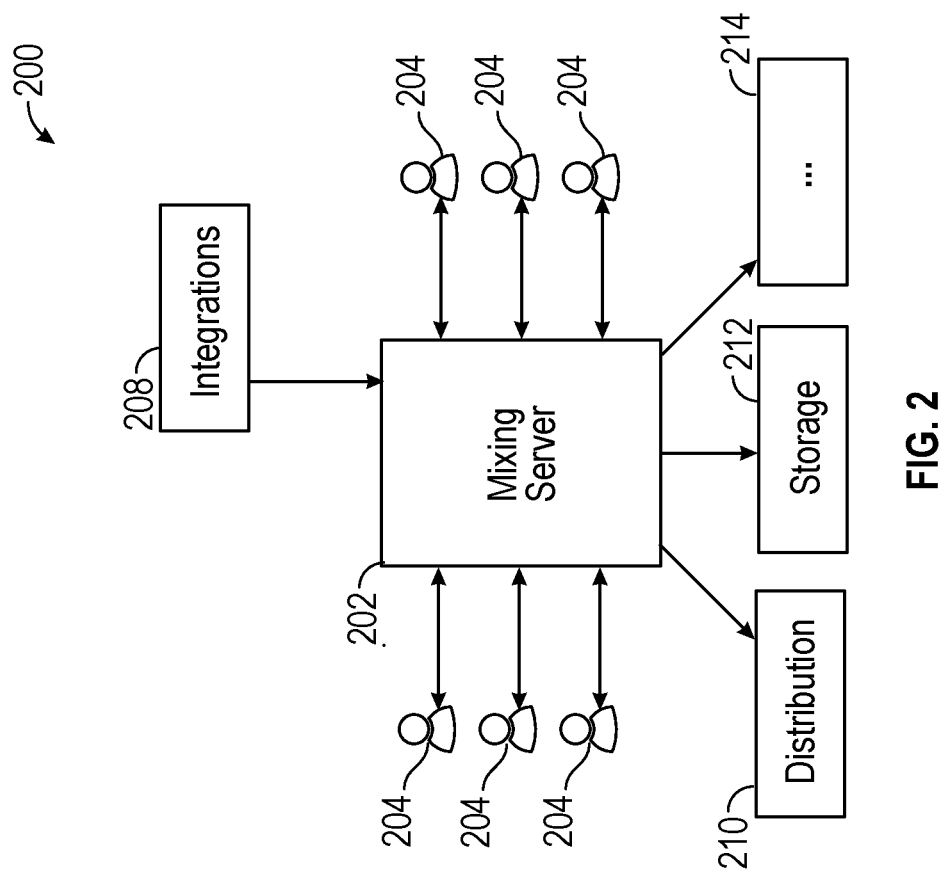
FIG. 2 depicts an exemplary system diagram relating so some embodiments of the invention.

Turning now to FIG. 2, an exemplary system diagram 200 is depicted for providing a mixed video stream during a video meeting session relating to some embodiments of the invention. In some embodiments, the system 200 comprises a mixing server 202 for mixing one or more received video streams. In some embodiments, the mixing server 202 receives a plurality of individual video streams from a respective plurality of participant users 204. Further, the mixing server 202 may receive one or more video integrations 208. The video integrations 208 may include any combination of additional features to be added to the video meeting session, such as, for example, a collaborative document, automatic captioning, a virtual whiteboard and other integrations, as will be described in further detail below. In some embodiments, the video integrations may include any number of third-party integrations from an external source which are integrated into the video meeting session.

In some embodiments, the mixing server 202 mixes the plurality of individual video streams into a mixed video stream which may include one or more video integrations 208. In some embodiments, the mixing server 202 provides the mixed video stream to a distribution server 210 which may distribute the mixed video stream to a plurality of external sources such as a plurality of viewing users or to an external streaming platform. Additionally, the mixed video stream may be provided to a storage server 212 which may store the mixed video stream in a data store. For example, in some embodiments, at least a portion of the video meeting session may be recorded and the recording saved by the storage server 212. Further, the mixed video stream may be provided to a number of additional external sources 214.

Figure 3A:
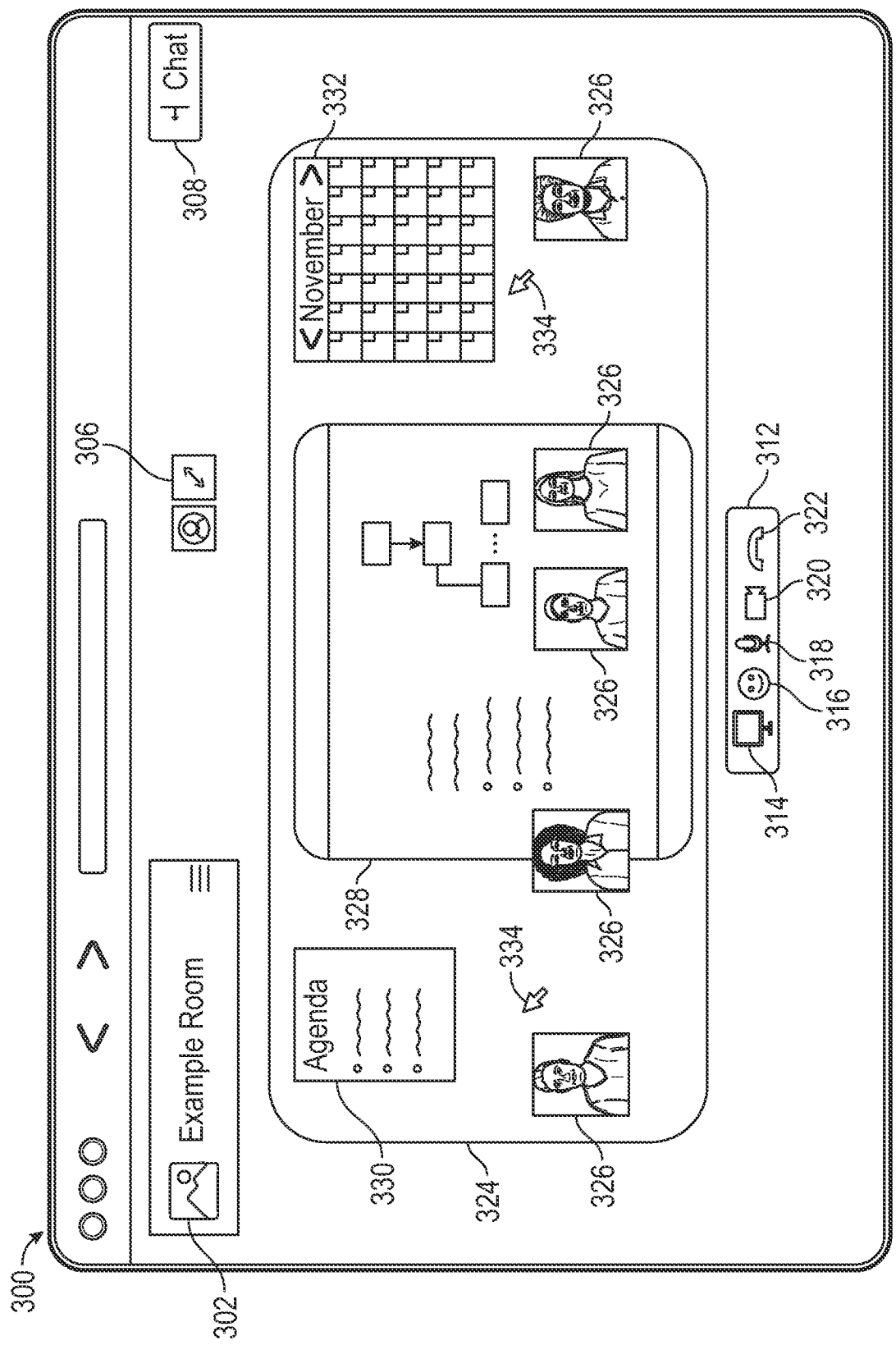
FIG. 3A depicts an exemplary graphical user interface including a meeting environment relating to some embodiments of the invention.

Turning now to FIG. 3A, an exemplary graphical user interface 300 is depicted relating to some embodiments of the invention. In some embodiments, the graphical user interface 300 may be generated for display, for example, on a screen of a user device during a video meeting session. In some embodiments, the graphical user interface 300 comprises a title indicator 302 which may indicate a title associated with the currently active video meeting session. Further, in some embodiments, the title indicator 302 may be displayed along with additional display objects such as, for example, a video meeting session icon, which may be an image associated with the video meeting session, a private indicator, which may indicate whether the video meeting session is private or public, as well as additional display objects not explicitly described herein.

In some embodiments, the graphical user interface 300 further includes a link actuator 306, which in some embodiments, may be selected to generate a link associated with the video meeting session. For example, in some embodiments, a user may select the link actuator 306 to copy a hyperlink which may be shared with other users to allow said other users to access the video meeting session. In some embodiments, the link actuator 306, when selected, may be used to generate an invitation which includes a link for one or more other users to join the video meeting session.

Further still, the graphical user interface 300 may include a chat window 308 which may be used to display a chat associated with the video meeting session. For example, the chat window 308 may provide a text-based communication environment for participants and viewers of the video meeting session. However, in some embodiments, it should be understood that the chat window 308 may allow alternative forms of communication besides text messages such as messages include, emojis, images, audio, and other types of files. In some embodiments, the chat window 308 includes a message composer which may be used to compose and send a message including any combination of text, emojis, images, and audio, within the chat window 308. In some embodiments, the chat window 308 may be compressed, as shown, but may be expanded, for example, when a user selects the chat window 308. In some embodiments, the chat window 308 may be compressed to provide additional room within the graphical user interface 300 for other graphical features of the video meeting session, as will be described in further detail below.

In some embodiments, a set of video meeting controls 312 may be included within the graphical user interface 300. In some such embodiments, the set of video meeting controls 312 may include any combination of a share screen actuator 314, an emoji actuator 316, a microphone actuator 318, a camera actuator, and a leave session actuator 322, as shown. The share screen actuator 314 may be selected by a user to share said user's screen with other users within the video meeting session. The emoji actuator 316 may be used to submit emojis within the video meeting session. For example, a user may select the emoji actuator 316 to generate a list of emojis which may then be shared and displayed within the graphical user interface 300 to a plurality of users in the video meeting session for a predetermined period of time. The microphone actuator 318 may be selected to modify the output of a user's microphone within the video meeting session. For example, a user may select the microphone actuator 318 to mute or unmute their microphone. Similarly, the camera actuator 320 may be selected to enable/disable the user's camera. The leave session actuator 322 may be selected by a user to leave or close out of the video meeting session. In some embodiments, the positioning of the set of video meeting controls 312 may be adjusted.

In some embodiments, the graphical user interface 300 further comprises a shared virtual space 324 which may be rendered for display as part of the video meeting session. As such, in some embodiments, the shared virtual space 324 may include one or more video streams 326 corresponding to respective meeting participants. Accordingly, in some embodiments, any combination of video and audio data, which may be captured on a user device of each participant, is included within the participant's video stream 326 such that other meeting participants and viewers can see and hear the participant. Accordingly, the video stream 326 for each user may be positioned within the shared virtual space 324 based at least in part on user action within the video meeting session.

In some embodiments, one or more interactable virtual objects may be included within the shared virtual space 324. Accordingly, embodiments are contemplated in which a video stream 326 corresponding to a user is positioned within the shared virtual space 324 based on a user interaction with one of the virtual objects. In some embodiments, a virtual whiteboard 328 may be included within the shared virtual space 324, as shown. Here, the virtual whiteboard 328 may be interactable such that meeting participants are able to place text, images, and/or drawings over the virtual whiteboard 328. For example, in some embodiments, users may be able to draw, write, or type onto the virtual whiteboard 328 such that the text and images which the participant provides are displayed over the virtual whiteboard 328 to remaining participants and viewers of the video meeting session. For example, if a first user draws an image on the virtual whiteboard 328, the image will be visible within the shared virtual space 324 to the other users who are attending the video meeting session.

In some embodiments, one or more of the video streams 326 may be displayed over or adjacent to the virtual whiteboard 328 within the shared virtual space 324, as shown. Accordingly, embodiments are contemplated in which the video streams 326 may be positioned over or adjacent to the virtual whiteboard 328 responsive to the respective meeting participants interacting with the virtual whiteboard 328. For example, when the first user clicks on the virtual whiteboard 328 or begins to add text or an image to the virtual whiteboard 328 the first user's video stream may be automatically repositioned over or adjacent to the virtual whiteboard 328.

In some embodiments, a virtual agenda 330 or virtual notes section may be included within the shared virtual space 324, as shown. Accordingly, the virtual agenda 330 may be displayed within the graphical user interface 300 during the video meeting session. Here, the virtual agenda 330, similar to the virtual whiteboard, may be interactable such that meeting participants can add to and edit content within the virtual agenda 330. For example, users may provide notes or a list of text within the virtual agenda 330, which in some embodiments, may be generated at least partially before the video meeting session. In one example, a host user may create a meeting agenda before a video meeting session, then during the video meeting session the virtual agenda 330 may be generated to include the content from the pre-created meeting agenda. Accordingly, during the video meeting session the host user or other meeting participants may interact with the virtual agenda 330 to add check marks to meeting topics, edit meeting topics, add meeting topics, remove meeting topics, or add meeting notes. As with virtual whiteboard 328, discussing, managing agenda, or otherwise interacting with agenda 330 may cause the interacting user's video stream to be repositioned accordingly. In some embodiments, a repositioned stream may jump to its new location. In other embodiments, the repositioned stream may gradually move to its new location. In some such embodiments, the moving video stream may avoid other interactable elements, emulating the user walking over to the new element with which they are interacting.

In some embodiments, a virtual calendar 332 may be included within the shared virtual space 324, as shown. Here, the virtual calendar 332 may comprise an interactable calendar which is accessible and displayed during the video meeting session. For example, meeting participants may interact with the virtual calendar 332, for example, to add a scheduled deadline or event, flip to another date, month, or time, or to edit the calendar in some other way. In some embodiments, each of the interactable virtual objects may be repositioned or resized within the shared virtual space 324. In some embodiments, the interactable virtual objects may even be manipulated during the video meeting session. For example, a user may click and drag the virtual calendar 332 to reposition the virtual calendar 332 within the shared virtual space 324. Further, the interactable virtual objects may be resized during the video meeting session. Embodiments are contemplated in which one or more of the interactable virtual objects may be automatically resized or repositioned based on a user interaction with the respective virtual object. For example, if a user selects the virtual calendar 332 by tapping or clicking, the virtual calendar 332 may be automatically enlarged or expanded within the shared virtual space 324. As discussed above, interacting with an object may also cause the interacting user's video stream to be repositioned accordingly.

Further, embodiments are contemplated in which a plurality of video streams 326 corresponding to a respective plurality of meeting participants are repositioned during the video meeting session based on user interaction. For example, in some embodiments, the video streams 326 may be configured to follow the respective cursor 334 of the respective user as it moves through the shared virtual space 324. Embodiments are contemplated in which the user's video stream directly follows the user's cursor 334 or even replaces the cursor 334. Alternatively, in some embodiments, the video streams 326 may be positioned in proximity to the user's cursor 334 or in proximity to some other action point determined based on a user interaction within the shared virtual space 324.

In some embodiments, various different approaches may be included to determine the position of the video streams 326. For example, in some embodiments, the video streams 326 may be positioned a set distance to the right of the user's cursor. However, embodiments are contemplated in which the position of the video stream 326 may be determined based further on a context within the shared virtual space 324. For example, in some embodiments, the video stream 326 may follow the cursor 334 but be adjusted to a different side of the cursor 334 so as to not interfere with other parts of the shared virtual space 324 such as other video streams, or virtual objects. Accordingly, the video streams 326 may be positioned such that they do not cover the display of other objects within the shared virtual space 324. Further, in some embodiments, the transparency of the video streams 326 may increase when the video streams 326 are displayed over other objects such that the objects are still visible. Accordingly, embodiments are contemplated in which the transparency of the video streams 326 may be adjusted based on the positioning of each video stream within the shared virtual space 324.

Figure 3B:
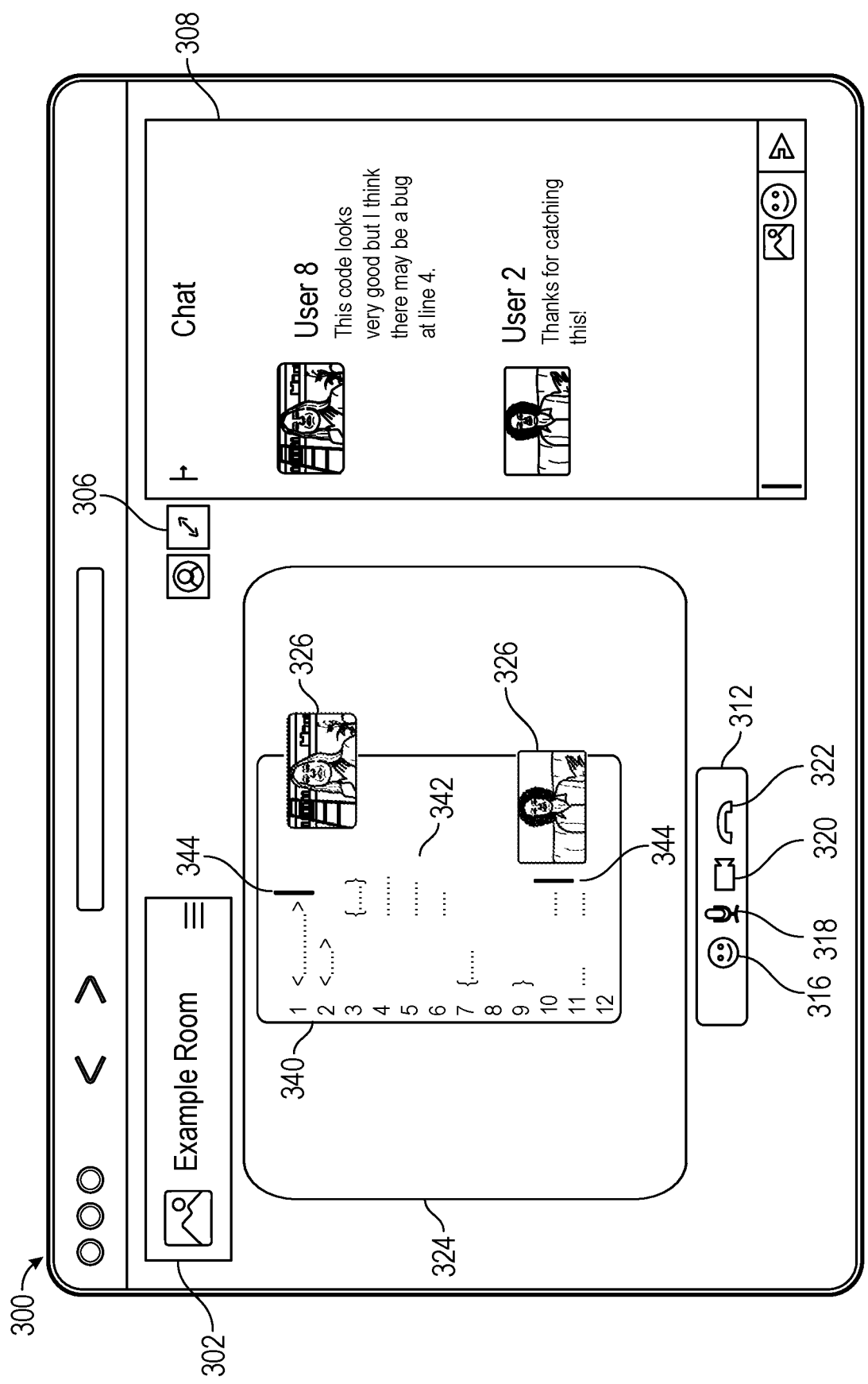
FIG. 3B depicts an exemplary graphical user interface including a collaborative document environment relating to some embodiments of the invention.

Turning now to FIG. 3B, the graphical user interface 300 including a collaborative document environment is depicted relating to some embodiments of the invention. Accordingly, the graphical user interface 300 may include some similar features as described above with respect to FIG. 3A, such as the title indicator 302, the link actuator 306, the chat window 308, and the set of video meeting controls 312. In some embodiments, the chat window 308 may be expanded, as shown and described above. Accordingly, meeting participants may be able to share messages within the chat window 308. Alternatively, in some embodiments, the chat window 308 may not be included. For example, embodiments are contemplated in which text-based chat messages may be included within the shared virtual space 324 such as on one of the virtual objects or adjacent to one of the video streams 326. In some embodiments, meeting participants may be able to insert text boxes (or captions associated with the user's icon or video stream) and images or start message threads at various positions within the shared virtual space 324.

In some embodiments, a collaborative real-time editor 340 may be included within the shared virtual space 324, as shown. The collaborative real-time editor 340 may be associated with a document for which meeting participants can collaborate and edit. In one example, the collaborative real-time editor 340 may be used for a group of users to collaborate while writing computer code. Here, the users may use pair programming techniques remotely during the video meeting session such that a first user writes code while a second user reviews the code. Further, a communication environment is provided by the shared virtual space 324 such that the users can discuss a strategy for the code or share material such as reference links during the video meeting session. In some embodiments, one or more lines of code 342 may be included within the collaborative real-time editor 340, as shown. In some embodiments, a text cursor indicator 344 may be included for each respective meeting participant showing that participants current cursor position within the collaborative real-time editor 340. In some embodiments, the video streams 326 may be positioned in proximity to the text cursor indicator 344 of each respective user, as shown. Accordingly, the meeting participants are able to identify where each user is at within the collaborative document.

Figure 3C:
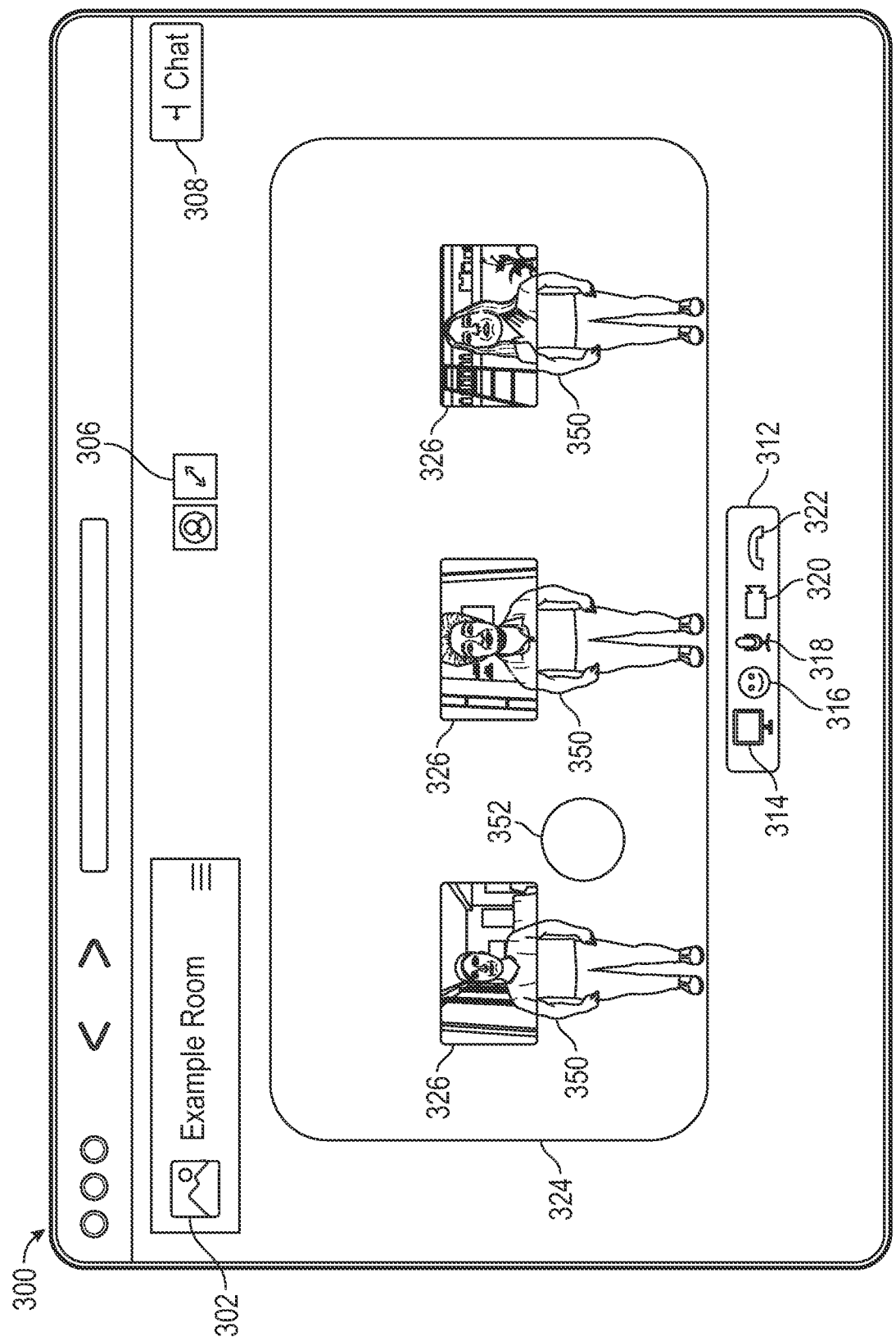
FIG. 3C depicts an exemplary graphical user interface including a virtual environment relating to some embodiments of the invention.

Turning now to FIG. 3C, the graphical user interface 300 is depicted including a virtual environment relating to some embodiments of the invention. Here, the graphical user interface 300 may comprise many of the same components as described above with respect to FIGS. 3A and 3B. However, in some embodiments, the graphical user interface 300 further comprises one or more participant avatars 350 displayed within the shared virtual space 324, as shown. In some embodiments, each of the participant avatars 350 includes a video stream 326, as shown. Accordingly, embodiments are contemplated in which each meeting participant is associated with a participant avatar 350 such that the meeting participant controls that participant avatar 350 which includes the meeting participant's video stream. As such, an interactive virtual environment is provided within the shared virtual space 324. In some embodiments, the meeting participants may control and manipulate their avatar 350, for example, to change the position of the avatar 350 within the shared virtual space 324, which also changes the position of the participant's video stream 326. It is contemplated that this interactive virtual embodiment can be used alone or in combination with any of the other embodiments discussed herein.

In some embodiments, a manipulatable object 352 may be included within the shared virtual space 324, as shown. In some embodiments, the manipulatable object 352 may be manipulated by the participant avatars 350. For example, embodiments are contemplated in which the manipulatable object 352 comprises a ball which can be moved by the participant avatars 350. For example, in some embodiments, the manipulatable object 350 may be held by the participant avatar 350. Accordingly, embodiments are contemplated in which the video streams 326 may be affected when the manipulatable object 352 is held. In one example, the manipulatable object 352 may indicate a speaker user such that the participant who is holding the manipulatable object 352 may have an increased audio volume. It should be understood that various other types of manipulatable objects are also contemplated. Further, in some embodiments, the participant avatars 350 may be included in the shared virtual space 324 along with other components such as the virtual whiteboard 328.

In some embodiments, the shared virtual space 324 may comprise any combination of 2-dimensional or 3-dimensional elements. For example, in some embodiments, the participant avatars 350 are provided within a virtual, 3-dimensional environment. Alternatively, in some embodiments, the avatars 350 may be provided within a 2-dimensional environment. It should be understood that the video streams 326 are typically received as a series of 2-dimensional video image frames. However, embodiments are contemplated in which the 2-dimensional video streams 326 are overlaid onto 3-dimensional avatars such that the video streams 326 appear to be 3-dimensional. For example, in some embodiments, the avatars 350 may comprise 3-dimensional character models and at least a portion of a respective video stream 326 may be overlaid onto (or texture mapped to) a face portion of each character model.

In some embodiments, various aspects of the video meeting session may be determined based on an action point position within the shared virtual space 324. For example, in some embodiments, spatial audio may be employed such that the audio may be adjusted based on the position of the video stream 326 or avatar 350 within the shared virtual space 324. Here, the audio for each user may be determined based at least in part on that user's position within the shared virtual space 324. Accordingly, audio may be panned and volume controlled based on positioning within the shared virtual space 324.

In one example, a first video stream is positioned on a left side of the shared virtual space 324 and a second video stream is positioned on the right side of the shared virtual space 324. Here, if a first user associated with the first video stream speaks, the generated audio stream will be panned to the left for a second user associated with the second video stream, since the first video stream is positioned to the left relative to the respective action point of the second user (in some cases, the position of the second user's video stream.) Further, the volume of the output audio stream may be determined based on the distance between the two video streams or action points. For example, the volume of the audio may decrease as the video streams move further apart. As such, because the panning and volume are controlled based on positioning within the shared virtual space 324 an immersive interactive environment is provided which more closely resembles a physical meeting environment. Further, it should be understood that the audio may be controlled within either a 3-dimensional or 2-dimensional environment.

It should be understood that the shared virtual space 324 may be provided for a formal meeting context, as well as an informal meeting context. Further, in some embodiments, the shared virtual space 324 may be utilized for providing a gaming or entertainment environment. For example, in some embodiments, the shared virtual space 324 may be used for providing a multiplayer video gaming experience in which meeting participants are able to play a video game together. Further, the shared virtual space 324 may be used to provide an environment for playing virtual card games or board games, as will be described in further detail below. In some such embodiments, the participant avatars 350 may be used as part of the video game. Further, multiple integrations may be provided for entertaining meeting participants, for example, before a meeting begins. As such, in some embodiments, a virtual waiting room or lobby may be provided such that meeting participants are joined to the virtual waiting room before the meeting begins. Accordingly, the virtual waiting room may provide the shared virtual space 324, as described herein.

Figure 3D:
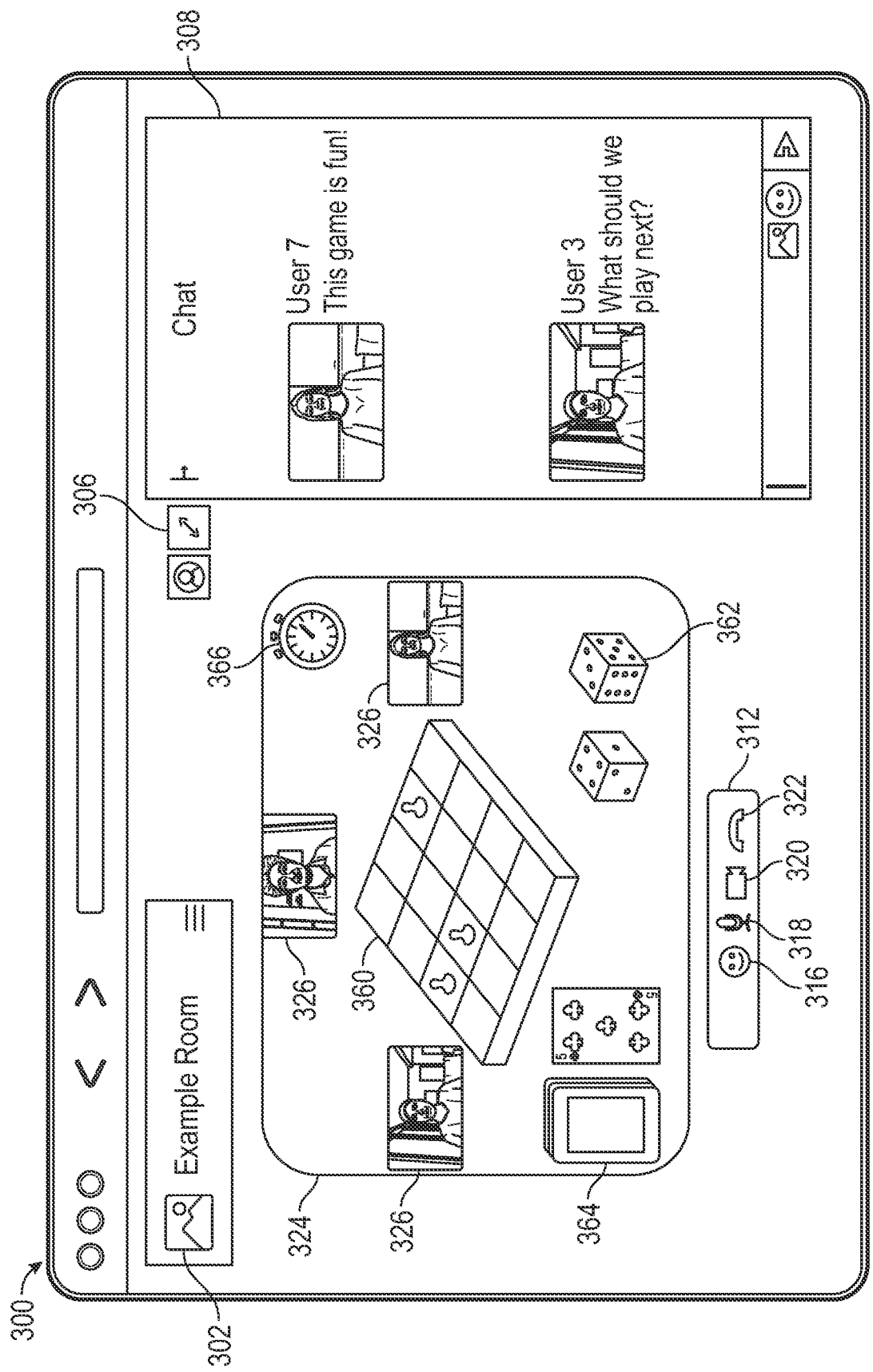
FIG. 3D depicts an exemplary graphical user interface including an entertainment environment relating to some embodiments of the invention.

Turning now to FIG. 3D, the graphical user interface 300 including a virtual entertainment environment is depicted relating to some embodiments of the invention. In some embodiments, the shared virtual space 324 comprises various entertainment elements, as shown. For example, a virtual game board 360 may be included within the shared virtual space 324 on which meeting participants may play a board game. In some embodiments, the virtual game board 360 may be selected from a plurality of game boards relating to a respective plurality of different games which are available within the shared virtual space 324. In some embodiments, one or more randomizable objects may be included within the shared virtual space 324 for providing randomness, for example, using a random number generator.

Accordingly, in some embodiments, the shared virtual space 324 may include a pair of virtual dice 362 for which the meeting participants may roll to add an element of randomness into the video meeting session. It should be understood that a different number of virtual dice 362 may be included. Further, different types of dice may be included with varying numbers of sides. In some embodiments, a deck of virtual playing cards 364 may be included within the shared virtual space 324, as shown, such that the meeting participants are able to play card games during the video meeting session or during a waiting period before the meeting begins. In some embodiments, the virtual playing cards 364 may be used to provide a further element of randomness as the virtual playing cards 364 can be shuffled within the shared virtual space 324. Additionally, in some embodiments, a virtual timer 366 may be included within the shared virtual space 324, as shown. In some such embodiments, the virtual timer 366 allows meeting participants to add time constraints into the video meeting session. In some embodiments, users are able to set, stop, and start the virtual timer 366. Further, embodiments are contemplated in which a plurality of virtual timers may be included.

In some embodiments, one or more video streams 326 are included within the shared virtual space 324, as shown. In some embodiments, the video streams 326 may be positioned based at least in part on a turn order of a game associated with the gaming elements within shared virtual space 324. For example, if a turn order of the game is set to first user, second user, third user, and then a fourth user. The video streams for the respective users may be positioned to reflect this turn order such that the video streams are arranged in a similar order clockwise around the virtual game board 360.

Figure 3E:
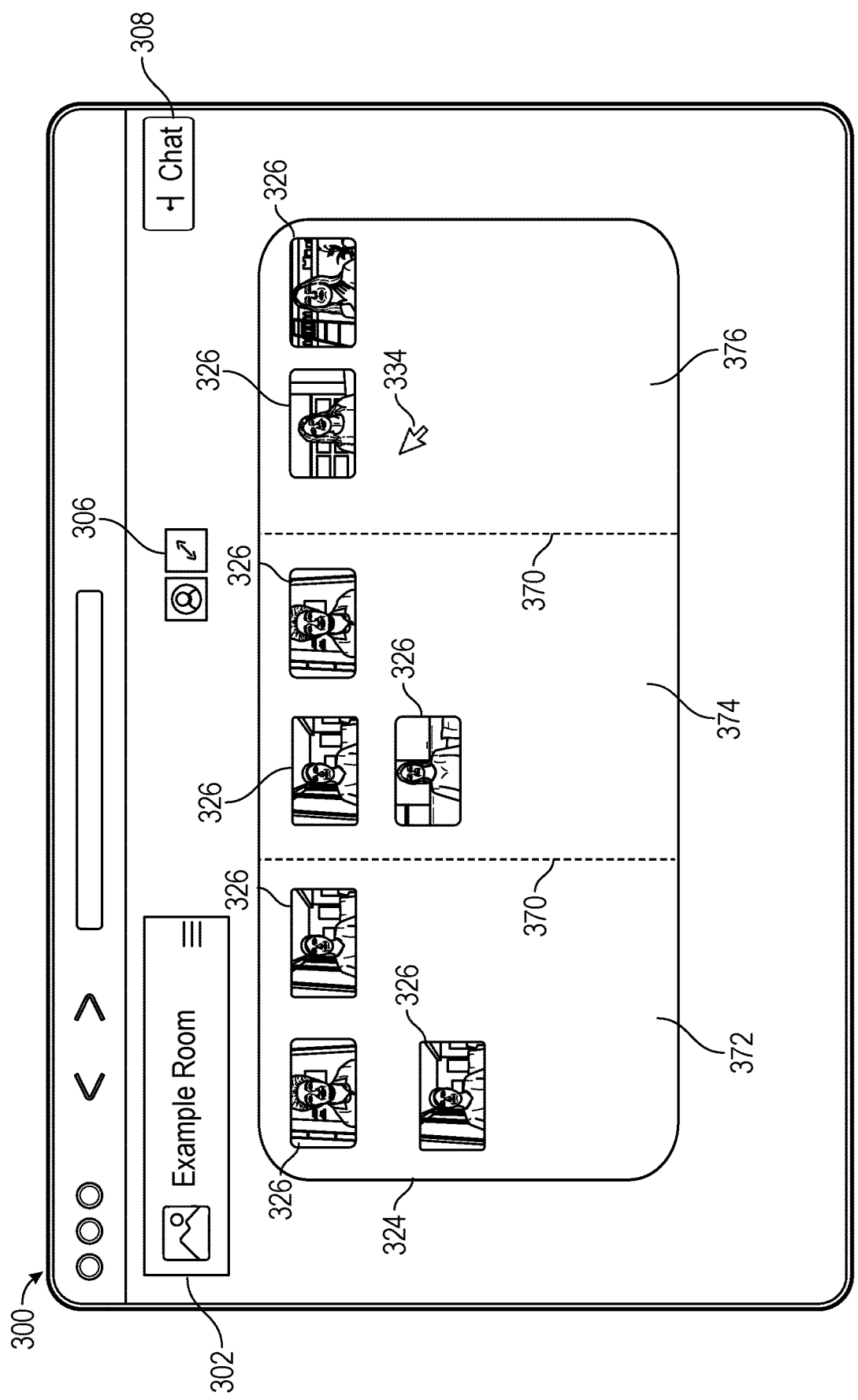
FIG. 3E depicts an exemplary graphical user interface including an adjustable breakout environment relating to some embodiments of the invention.

Turning now to FIG. 3E, the graphical user interface 300 including an adjustable breakout environment is depicted relating to some embodiments of the invention. In some embodiments, one or more adjustable partitioning lines 370 may be included within the shared virtual space 324, as shown. In some such embodiments, the partitioning lines 370 may be used to spatially separate a video meeting session into two or more separate video meeting sessions or breakout rooms. For example, a first shared virtual space portion 372, a second shared virtual space portion 374, and a third shared virtual space portion 376 may be defined using the partitioning lines 370. In some embodiments, the partitioning lines 370 may be adjustable and user defined. For example, a user may use a marking tool or some other means provided within the graphical user interface 300 to draw the partitioning lines 370. Alternatively, in some embodiments, a user may be able to select between a set of predefined partitioning lines to be added to the shared virtual space 324.

In some embodiments, the partitioning lines 370 may divide the shared virtual space 324 into two or more different parts and may be created or removed at will. Accordingly, in some embodiments, the video and audio streams may be provided to a set of users within each respective shared virtual space portion. For example, the video streams 326 within the first shared virtual space portion 372 may be shared with other users within the first shared virtual space portion 372. In some embodiments, users may be able to select one of the first shared virtual space portion 372, the second shared virtual space portion 374, or the third shared virtual space portion 374, for example, by tapping or clicking with the cursor 334. Accordingly, in some embodiments, the users may be able to switch between the various portions of the shared virtual space 324. Such breakout partitions may be employed with any of the other embodiments discussed above. For example, if players of a board game are divided into teams, a partition may be created between the teams to allow for private discussion of strategy and removed to communicate with all players.

Figure 3F:
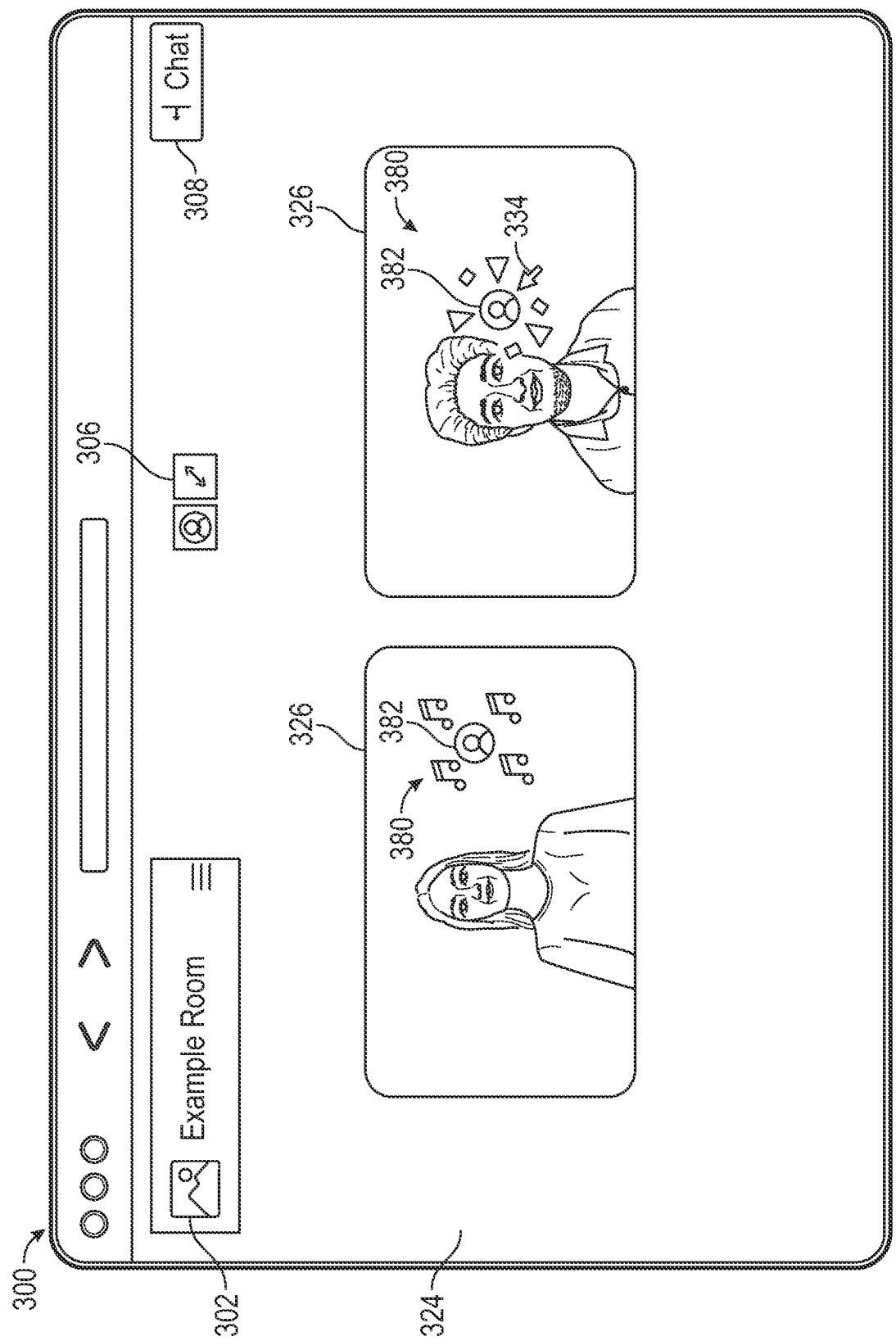
FIG. 3F depicts an exemplary graphical user interface including interactive reactions relating to some embodiments of the invention.

Turning now to FIG. 3F, the graphical user interface 300 including interactive reactions 380 is depicted relating to some embodiments of the invention. As shown, in some embodiments, one or more interactive reactions 380 may be generated within the shared virtual space 324. In some embodiments, a user icon 382 may be displayed as part of the interactive reaction 380. Here, the user icon 382 may indicate the user who initiated the interactive reaction 380. In some embodiments, the user icon 382 may include a profile image of the user, the user's initials, or a username of the user. In some embodiments, the interactive reactions 380 may be displayed over the one or more video streams 326, as shown. For example, in some embodiments, a user may move the cursor 334 and click to place one or more interactive reactions 380. Further, in some embodiments, users may select from a set of preconfigured interactive reactions. For example, interactive reactions 380 may include a confetti reaction, a music reaction, emoji reactions, and a variety of other types of reactions. In some embodiments, a plurality of different confetti reactions may be available. For example, a user may select between a variety of different confetti reactions with different colors. Additionally, in some embodiments, users may be able to create their own custom interactive reactions. Embodiments are contemplated in which users may select either a pen or highlighter reaction such that a marking tool follows the user's cursor. Accordingly, the user can write or draw within the shared virtual space 324 using the marking tool.

In some embodiments, the interactive reaction 380 may be configured to include both an image and audio. Further, in some embodiments, the interactive reaction 380 may include an animation or video filter effect. For example, in some embodiments, when a user adds the confetti interactive reaction within the shared virtual space 324 a confetti sound may be played as part of the video meeting session audio and a confetti animation may be displayed within the shared virtual space 324. In some embodiments, the audio may include a short jingle or music to be played along with the reaction image or animation. Further, in some embodiments, the audio may include sounds associated with the reaction image or animation. Alternatively, in some embodiments, the interactive reaction 380 may not include audio. In some embodiments, the interactive reaction 380 may be displayed adjacent to an action point within the shared virtual space 324 such as next to a cursor position of the user who initiated the reaction.

In some embodiments, users may be able to specify a location for which interactive reactions 380 can be displayed. For example, a user may specify that interactive reactions 380 should not be displayed over the center of their video stream as to not block the user's face within the video stream. Accordingly, the interactive reactions 380 may be displayed in a corner of the video stream 326 or next to the video stream 326. In some embodiments, the interactive reaction 380 may comprise a video filter. For example, a user may select a hat interaction reaction which causes a hat filter to be displayed over another user's video stream such that it appears as if the user is wearing a hat. In some embodiments, users may only provide interactive reactions 380 to the video streams of other users. Alternatively, in some embodiments, users may be able to add interactive reactions 380 to their own video streams. In some embodiments, users may be able to selectively disable interactive reactions 380 for their own stream (globally or for one or more specified users) or as they view others' streams.

It should be understood that, in some embodiments, the shared virtual space 324 may comprise any combination of the elements described herein with respect to FIGS. 3A-3F. For example, in some embodiments, the shared virtual space 324 may comprise both of the virtual whiteboard 328 and the collaborative real-time editor 340. Further, additional elements and integrations not explicitly described herein may also be included to enhance the immersive aspects of the video meeting session, provide entertainment, and collaborative functionality within the shared virtual space 324.

Figure 4:
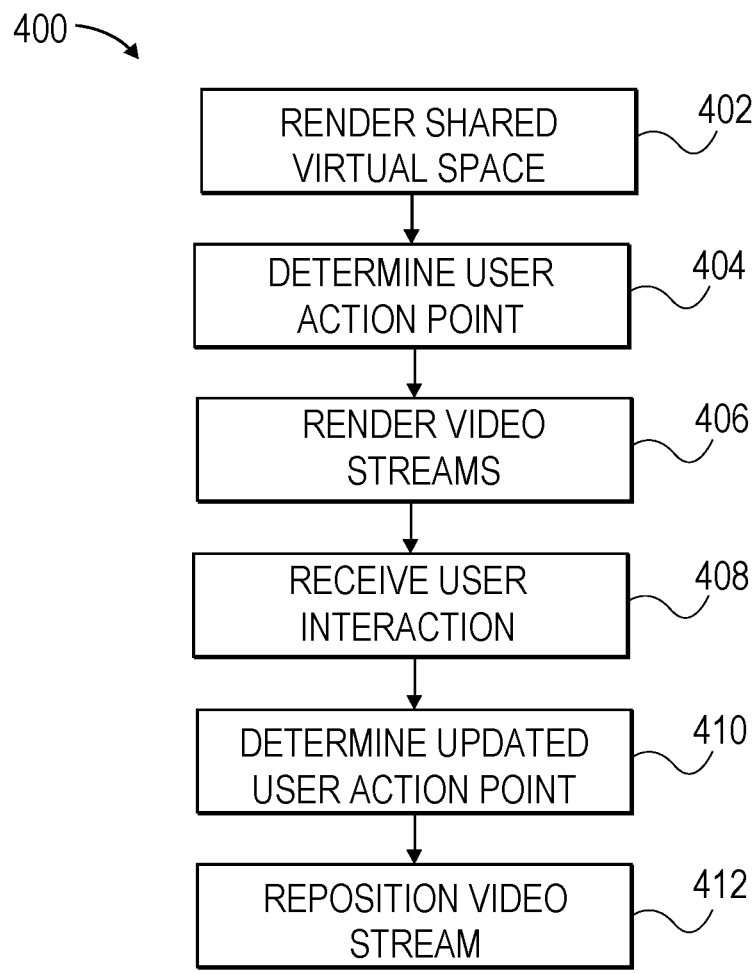
FIG. 4 depicts an exemplary method for providing a shared virtual meeting environment relating to some embodiments of the invention.

Turning now to FIG. 4, a method for providing a shared virtual meeting environment is depicted relating to some embodiments of the invention. In some embodiments, at least a portion of the steps described herein with respect to the method 400 may be executed on at least one processor. For example, the steps may be performed on one or more processors included as part of the components of the system 100 or the system 200, shown in FIGS. 1 and 2 respectively. In some embodiments, a first processor may be programmed to perform a first portion of steps while a second processor may be programmed to perform a second portion of steps.

At step 402 the shared virtual space 324 is rendered. In some embodiments, the shared virtual space 324 may be rendered within the graphical user interface 300 which may be generated for display on one or more user devices. For example, the shared virtual space 324 may be displayed on a screen of a respective user device of each meeting participant of a video meeting session. In some embodiments, the shared virtual space 324 may be rendered for display during the video meeting session. Alternatively, in some embodiments, the shared virtual space 324 may be rendered for display before the video meeting session begins as part of a virtual waiting room, as described above. In some embodiments, the shared virtual space 324 may be rendered within the web browsers of the respective meeting participants.

At step 404 an action point is determined within the shared virtual space 324. In some embodiments, an action point is determined for each user of a plurality of users who are participating in the video meeting session. Accordingly, a plurality of different action points may be determined each corresponding to a respective user. In some embodiments, a set of initial action points may be predetermined such that preconfigured positions for each video stream are set within the shared virtual space 324. For example, predetermined action points may be set based at least in part on the in order which meeting participants join the video meeting session. At step 406 a plurality of video streams 326 are rendered for display. Each video stream corresponds to a respective user of the plurality of users. In some embodiments, each of the video streams 326 may be overlaid onto the shared virtual space in proximity to the corresponding action point determined at step 404.

At step 408 a user interaction is received within the shared virtual space from a first user of the plurality of users. In some embodiments, one or more user interactions may be received, for example, from more than one user. At step 410 an updated action point is determined based on the received user interaction. In some embodiments, in which a plurality of user interactions is received, a plurality of updated action points may be determined. At step 412 a video stream corresponding to the first user is repositioned in proximity to the updated action point within the shared virtual space 324. In some embodiments, the video stream is repositioned in response to receiving the user interaction. For example, if a user selects a point in the shared virtual space 324, the action point will be updated to that point and the user's video stream will be automatically repositioned in proximity to the point in the shared virtual space 324.

In another example, each of the video streams 326 may be tied to a respective participant avatar 350, as described above with respect to FIG. 3C. Accordingly, the received user interaction may comprise a user selecting controls to move their participant avatar 350. Further still, the user interaction may comprise a selection of one or more interactable objects within the shared virtual space 324 such as, for example, the virtual whiteboard 328, the virtual agenda 330, the virtual calendar 332, the collaborative real-time editor 340, the manipulatable object 352, the virtual game board 360, the virtual dice 362, the virtual playing cards 364, or the virtual timer 366.

It should be understood that, in some embodiments, additional steps may be included. Further, in some embodiments, various steps may be rearranged and performed in a different order. Further still, certain steps may be repeated. For example, the video stream 326 may be repositioned numerous times over the course of the video meeting session based on a series of subsequent received user interactions within the shared virtual space 324.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by at least one processor, perform a method for providing a shared virtual meeting environment within a video meeting session, the method comprising:
   generating a shared virtual space with a virtual object for collaborative editing during the video meeting session;
   receiving a plurality of video streams, each video stream comprising a live video feed from a user of a plurality of users;
   rendering the shared virtual space with each video stream of the plurality of video streams overlaid onto the shared virtual space in proximity to an initial action point associated with each respective user, wherein the initial action point is different than one or more locations at which users interact with the virtual object;
   receiving a user interaction at a first position about the virtual object from a first user of the plurality of users, wherein the user interaction comprises edits being made to the virtual object;
   determining, based on the user interaction, an updated action point for the first user, the updated action point corresponding to the first position about the virtual object;
   responsive to the user interaction, repositioning a first video stream of the first user in proximity to the updated action point within the shared virtual space; and
   presenting the edits that are made to the virtual object at the first position by the user interaction with the live video feed of the first video stream playing in proximity of the updated action point and other live video feeds associated with other video streams of the plurality of video streams playing at the initial action point associated with the user of each of the other video streams.

2. The non-transitory computer-readable media of claim 1, wherein the shared virtual space comprises a plurality of interactable objects.

3. The non-transitory computer-readable media of claim 2, wherein the plurality of interactable objects comprises a shared virtual whiteboard.

4. The non-transitory computer-readable media of claim 3, wherein the plurality of interactable objects further comprises a randomizable object.

5. The non-transitory computer-readable media of claim 1, wherein the method further comprises generating an interactive reaction comprising at least one image within the shared virtual space based on a user action.

6. The non-transitory computer-readable media of claim 1, further comprising:
   receiving a subsequent user interaction within the shared virtual space from the first user; and
   responsive to the subsequent user interaction, repositioning the first video stream of the first user in proximity to a subsequent action point within the shared virtual space associated with the subsequent user interaction.

7. The non-transitory computer-readable media of claim 1, wherein the shared virtual space further comprises a plurality of participant avatars, each participant avatar of the plurality of participant avatars corresponding to a respective user of the plurality of users, wherein each participant avatar is associated with a respective video stream of the plurality of video streams.

8. The computer-readable media of claim 1, wherein the method further comprises:
receiving a second user interaction that a second user from the plurality of users has with the virtual object at a second position;
responsive to the second user interaction, repositioning a second video stream of the second user in proximity to a second action point within the shared virtual space corresponding to the second position; and
presenting edits that are made to the virtual object at the second position by the second user interaction with the live video feed of the second video stream playing in proximity of the second action point and with the live video feed of the first video stream playing in proximity of the updated action point and the edits that are made to the virtual object by the user interaction of the first user.

9. A method for providing a shared virtual meeting environment within a video meeting session, the method comprising:
generating a shared virtual space with a virtual object for collaborative editing during the video meeting session;
receiving a plurality of video streams, each video stream comprising a live video feed from a user of a plurality of users;
rendering the shared virtual space with each video stream of the plurality of video streams overlaid onto the shared virtual space in proximity to an initial action point associated with each respective user, wherein the initial action point is different than one or more locations at which users interact with the virtual object;
receiving a user interaction at a first position about the virtual object from a first user of the plurality of users, wherein the user interaction comprises edits being made to the virtual object;
determining, based on the user interaction, an updated action point for the first user, the updated action point corresponding to the first position about the virtual object;
responsive to the user interaction, repositioning a first video stream of the first user in proximity to the updated action point within the shared virtual space; and
presenting the edits that are made to the virtual object at the first position by the user interaction with the live video feed of the first video stream playing in proximity of the updated action point and other live video feeds associated with other video streams of the plurality of video streams playing at the initial action point associated with the user of each of the other video streams.

10. The method of claim 9, wherein the shared virtual space comprises a collaborative real-time editor, and wherein the user interaction is associated with a collaborative document within the collaborative real-time editor such that the updated action point is associated with a position within the collaborative document.

11. The method of claim 9, wherein the shared virtual space comprises a plurality of interactable objects.

12. The method of claim 11, wherein the user interaction from the first user is associated with an interactable object of the plurality of interactable objects such that the first video stream of the first user is repositioned in proximity to the interactable object.

13. The method of claim 9, wherein an output of an audio stream of the first user associated with the first video stream is adjusted based at least in part on a relative position of the first video stream.

14. The method of claim 9, further comprising:
receiving a second user interaction within the shared virtual space from a second user of the plurality of users; and
responsive to the second user interaction, repositioning a second video stream of the second user in proximity to a second action point within the shared virtual space associated with the second user interaction.

15. A system for video meetings, the system comprising:
one or more data stores; and
at least one processor programmed to perform a method for providing a shared virtual meeting environment within a video meeting session, the method comprising:
generating a shared virtual space with a virtual object for collaborative editing during the video meeting session;
receiving a plurality of video streams, each video stream comprising a live video feed from a user of a plurality of users;
rendering the shared virtual space with each video stream of the plurality of video streams overlaid onto the shared virtual space in proximity to an initial action point associated with each respective user, wherein the initial action point is different than one or more locations at which users interact with the virtual object;
receiving a user interaction at a first position about the virtual object from a first user of the plurality of users, wherein the user interaction comprises edits being made to the virtual object;
determining, based on the user interaction, an updated action point for the first user, the updated action point corresponding to the first position about the virtual object;
responsive to the user interaction, repositioning a first video stream of the first user in proximity to the updated action point within the shared virtual space; and
presenting the edits that are made to the virtual object at the first position by the user interaction with the live video feed of the first video stream playing in proximity of the updated action point and other live video feeds associated with other video streams of the plurality of video streams playing at the initial action point associated with the user of each of the other video streams.

16. The system of claim 15, the method further comprising:
receiving a subsequent user interaction within the shared virtual space from the first user; and
responsive to the subsequent user interaction, repositioning the first video stream of the first user in proximity to a subsequent action point within the shared virtual space associated with the subsequent user interaction.

17. The system of claim 15, wherein the shared virtual space further comprises a plurality of participant avatars, each participant avatar of the plurality of participant avatars corresponding to a respective user of the plurality of users, wherein each participant avatar is associated with a respective video stream of the plurality of video streams.

18. The system of claim 15, wherein the shared virtual space comprises a collaborative real-time editor, and wherein the user interaction is associated with a collaborative document within the collaborative real-time editor such that the respective initial action point is associated with a position within the collaborative document.

19. The system of claim 15, wherein the shared virtual space comprises a plurality of interactable objects.

20. The system of claim 19, the method further comprising:
  receiving a subsequent user interaction with an interactable object of the plurality of interactable objects from the first user of the plurality of users; and
  responsive to the subsequent user interaction, further repositioning the first video stream of the first user in proximity to the interactable object within the shared virtual space.

* * * * *